UNITED STATES PATENT OFFICE.

THOMAS WALLACE, OF NEW YORK, N. Y.

CONDUIT FOR ELECTRICAL DISTRIBUTION.

SPECIFICATION forming part of Letters Patent No. 371,111, dated October 4, 1887.

Application filed September 25, 1885. Renewed February 14, 1887. Serial No. 227,603. (No model.)

*To all whom it may concern:*

Be it known that I, THOMAS WALLACE, a citizen of the United States, residing in the city, county, and State of New York, have invented certain new and useful Improvements in Conduits for Electrical Distribution, of which the following is a specification.

My invention relates to systems of electrical distribution, and more especially to the manner of providing for the arrangement of the electric conductors; and it has for its object to provide a practical way of disposing of such conductors so as to avoid the necessity of stringing them upon poles or other supports erected in the streets.

My invention consists, primarily, in an underground conduit constructed as more particularly pointed out hereinafter, whereby the bulk of the conductors may be arranged therein, and in the combination therewith of an aerial system of supports for the conductors, whereby the individual lines may be extended to the various subscribers.

Referring to the accompanying drawings, forming part of this specification, Figure 1 is a cross-section of a conduit embodying my invention. Fig. 2 is a detail of the same. Fig. 3 illustrates the construction of a tower or support used in the aerial system. Fig. 4 is a general view showing the combination of the two systems of underground and aerial distribution; and Fig. 5, an enlarged detail section taken on a portion of the line $x$ $x$, Fig. 1.

The necessity of practically doing away with the present system of aerial distribution of electric conductors, especially in large cities, is well recognized, and various means have been suggested.

By my invention the electric wires, serving as conductors of currents of various kinds and for different uses, are arranged in conduits within an underground tunnel in such a manner that they are properly supported and protected from disturbing influences of all sorts and are readily accessible for purposes of maintenance.

The conduit O is composed entirely of iron and stone, and is in any proper form, though I prefer that shown in the drawings, as it is strong and durable and well adapted for the purpose. The base K consists of stone or similar material, upon which is supported the frame-work of the conduit, which is composed of cast or rolled iron standards A, sustaining arch-pieces B, of similar material, and these are securely connected together by bolts or otherwise. This frame-work is covered with plates C, of iron, preferably corrugated and secured to the standards and arches, forming a skin or covering for the conduit.

Secured to suitable flanges upon the standards and arches are the iron plates $a$, which serve as braces to the structure of the conduit, and these plates are perforated with holes of suitable size for the passage of the conductors. The arch-pieces and the standards are also perforated for the passage of cables of telegraph and telephone wires, or electric light and power conductors.

Supported upon the flanges $d$ of the standards and flanges $e$ of the brace-plates, as well as in the ribs $f$ of the arches, are rods or bars $c$, preferably of metal, upon which are mounted insulators $b$, of glass or porcelain, in the form of rollers. These rollers are located in proper relation to the perforations, as shown in Fig. 2, so that the wires or cables will rest entirely upon the insulators without contact with the metal plates, thus preventing injury to the conductors and allowing them to be freely drawn over the rollers in stringing or adjusting them.

The conduit shown is of such form and dimensions as to permit the line-man to walk through the same in an upright position, and the bottom may be formed with an elevation in the center and depressions at the sides, forming drains for the seepage of the tunnel, and on the sides thereof, supported in suitable brackets or otherwise, are large tubes D, which may be used for a variety of purposes, as pneumatic dispatch-tubes, &c.

Suitable testing-stations may be located at convenient points in the conduit for the usual purposes.

The whole structure of the conduit is covered with some suitable composition which will thoroughly insulate the same and protect it from rust or corrosion.

In the general disposition of the circuits—as of telephone-exchanges—the wires and cables for the several district or sub stations will pass (Model.)
W. H. H. BARTON.
THERMOSTAT.
No. 371,121. Patented Oct. 4, 1887.
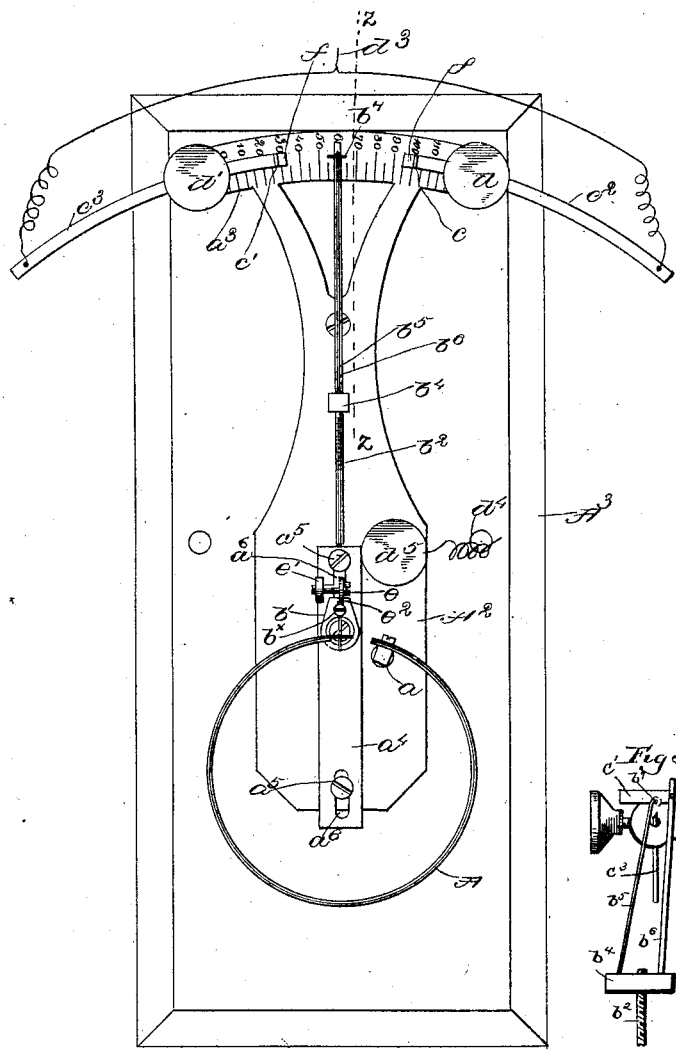
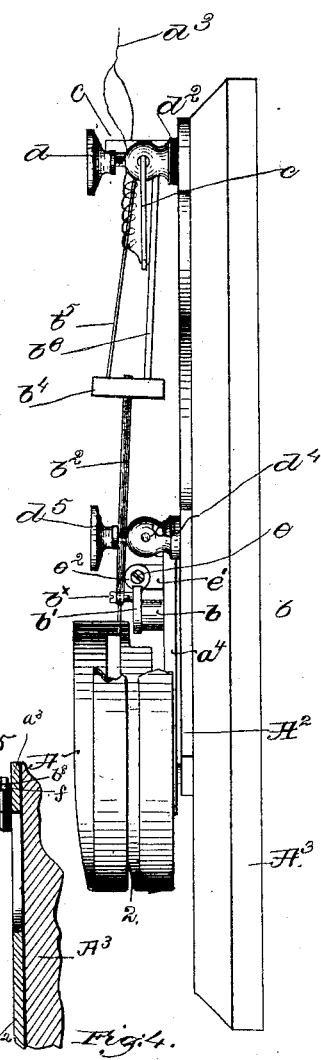
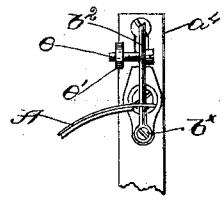
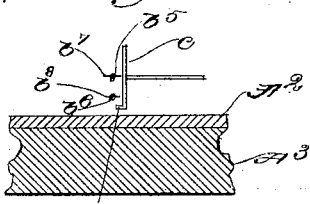
Witnesses
B. J. Ayres,
John F. C. Prinkert.
Inventor:
William H. H. Barton.
By Crosby & Gregory, attys.

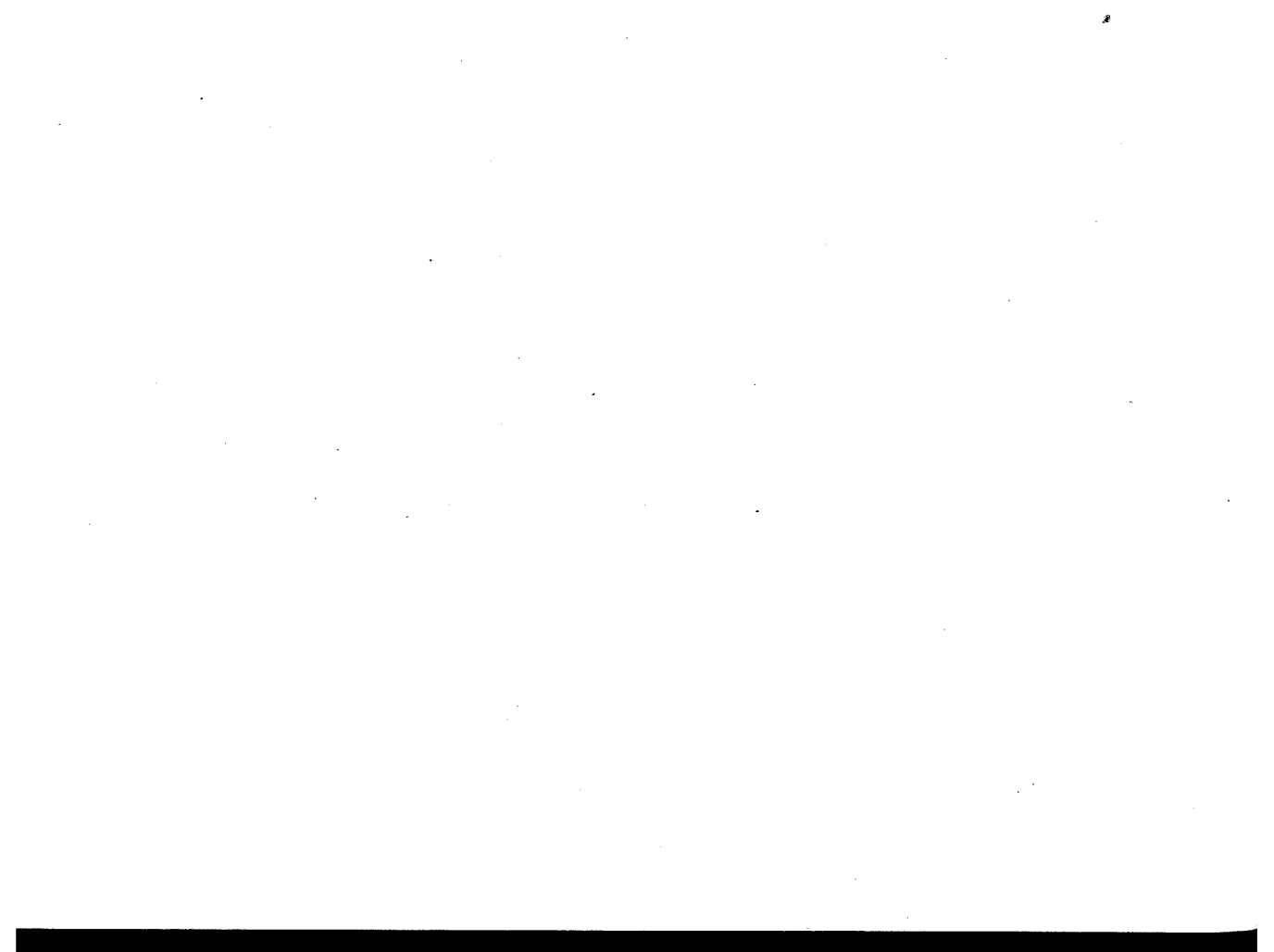

UNITED STATES PATENT OFFICE.

WILLIAM H. H. BARTON, OF BROCKTON, ASSIGNOR TO EDGAR W. UPTON AND HENRY G. RICE, OF PEABODY, AND HERBERT TORREY, OF HANOVER, MASSACHUSETTS.

THERMOSTAT.

SPECIFICATION forming part of Letters Patent No. 371,121, dated October 4, 1887.

Application filed August 12, 1886. Serial No. 210,705. (Model.)

*To all whom it may concern:*

Be it known that I, WILLIAM H. H. BARTON, of Brockton, county of Plymouth, and State of Massachusetts, have invented an Improvement in Thermostats, of which the following description, in connection with the accompanying drawings, is a specification, like letters on the drawings representing like parts.

This invention relates to improvements in the class of thermostatic instruments represented in United States Patent No. 305,499, in which a metallic strip is elongated and contracted by heat, the said strip having one end rigidly fastened and having its other end free to respond to variations in temperature.

The particular features in which my invention consists will be hereinafter pointed out in the claims at the end of this specification.

Figure 1 is a top or plan view of a thermostatic instrument constructed in accordance with my invention, the indicating-pointer being broken for a portion of its length; Fig. 2, a side elevation of Fig. 1, with the metallic strip broken out; Fig. 3, a modification; Fig. 4, a sectional detail, to be referred to; and Fig. 5 is a sectional detail, to be referred to, the section being taken on the line $z\,z$ of Fig. 1.

The metallic strip A, composed of laminæ of metal having different rates of expansion by heat, has one end rigidly fastened, as shown, to a metallic upright, $a$, secured to or forming part of a metal plate, $A^2$, the said plate being preferably secured to a base-block, $A^3$, designed to be fixed to an object located at the place where it is desired a constant temperature should be maintained, and whence variations from said constant temperature may be made known at a distant point. The spring A for the best results is provided with a longitudinal slot, 2, permitting the air to circulate therethrough, thereby rendering the spring more sensitive to changes in temperature.

The plate $A^2$ is herein shown as made at one end in the form of a segment of a circle, as at $a^3$, the said segment being provided with graduations to indicate different degrees of temperature.

The plate $A^3$, near its rear end, supports a slide-bar, $a^4$, secured thereto by screws $a^5$, extended through slots in the bar $a^4$, the said bar being thus made adjustable longitudinally to regulate the length of the arc traveled by the pointer. The slide-bar $a^4$ supports an upright, $b$, (see Fig. 2,) to which is pivotally secured a lever, $b'$, to one end of which is pivoted, preferably outside the spring A, as at $b^\times$, a rod, $b^2$, extended through or loosely connected to the free or movable end of the said spring, the other end of the rod $b^2$ being screwed into a bar, $b^4$, having attached to it two arms, $b^5\,b^6$, constituting pointers provided with contact lips or points $b^7\,b^8$, respectively.

The arm $b^5$ is substantially flexible or spring-like, and its contact-point $b^7$ is somewhat longer than the contact-point $b^8$ on the arm $b^6$, so that the contact-point $b^7$ will be brought into engagement with the upright ends $c\,c'$ of slide-bars $c^2\,c^3$ before the contact-points $b^8$, thus providing a double contact to guard against failure on the part of the instruments.

To enable the indicating-pointers to be normally set or fixed to show the temperature on the scale, I have provided a set-screw, $e$, extended through an upright, $e'$, on the slide-bar $a^4$. The set-screw $e$ is provided with a hub or collar, $e^2$, fitted into a slot in the end of the lever $b'$, as clearly shown in Fig. 1, so that when the said screw is rotated the lever $b'$ is turned on its pivot, thus moving the indicating-pointers over the graduated scale until the correct temperature is shown. After the pointers have been set, as described, the bars $c^2\,c^3$ are adjusted on opposite sides of the said pointers to the temperatures at which it is desired the circuit containing the alarm or indicating device should be operated, it being herein shown as closed when operated to give notice that the temperature of the locality in which the instrument is placed has arrived at a certain predetermined point.

To enable the bars $c^2\,c^3$ to be readily and quickly set at any degree on the scale, I have herein shown each upright portion $c\,c'$ of said bars as provided with a shoulder or finger, $f$, at its lower ends, the said shoulder or finger being in close proximity to the scale, so that, when desired, the said bars $c^2\,c^3$ may be moved to bring the edge of the said shoul-